Figure 1:
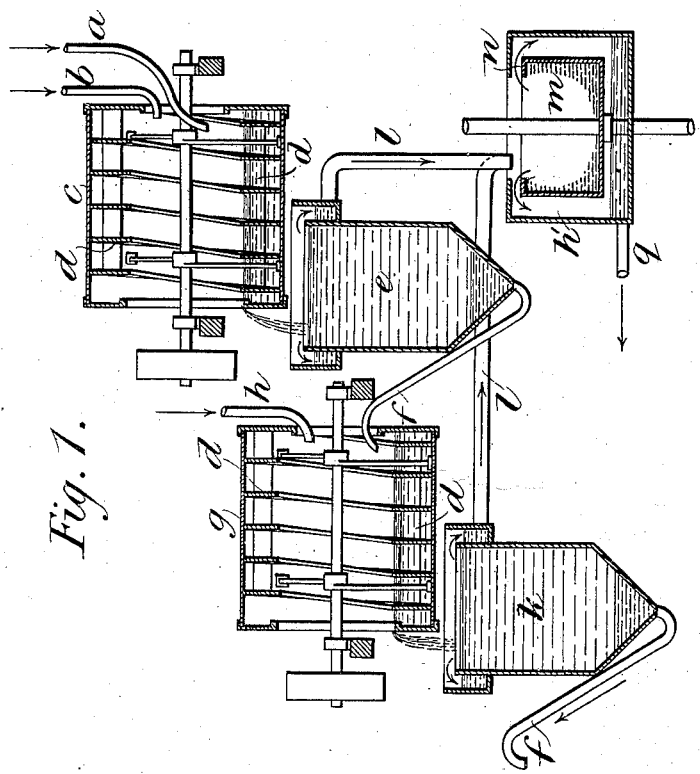

No. 653,340. Patented July 10, 1900.
F. E. ELMORE.
APPARATUS FOR SEPARATING METALLIC FROM ROCKY CONSTITUENTS OF ORES.
(Application filed Sept. 23, 1899.)
(No Model.) 2 Sheets—Sheet 1.

Witnesses
Inventor
Francis E. Elmore
by James L. Norris
atty

THE NORRIS PETERS CO., PHOTO-LITHO., WASHINGTON, D. C.

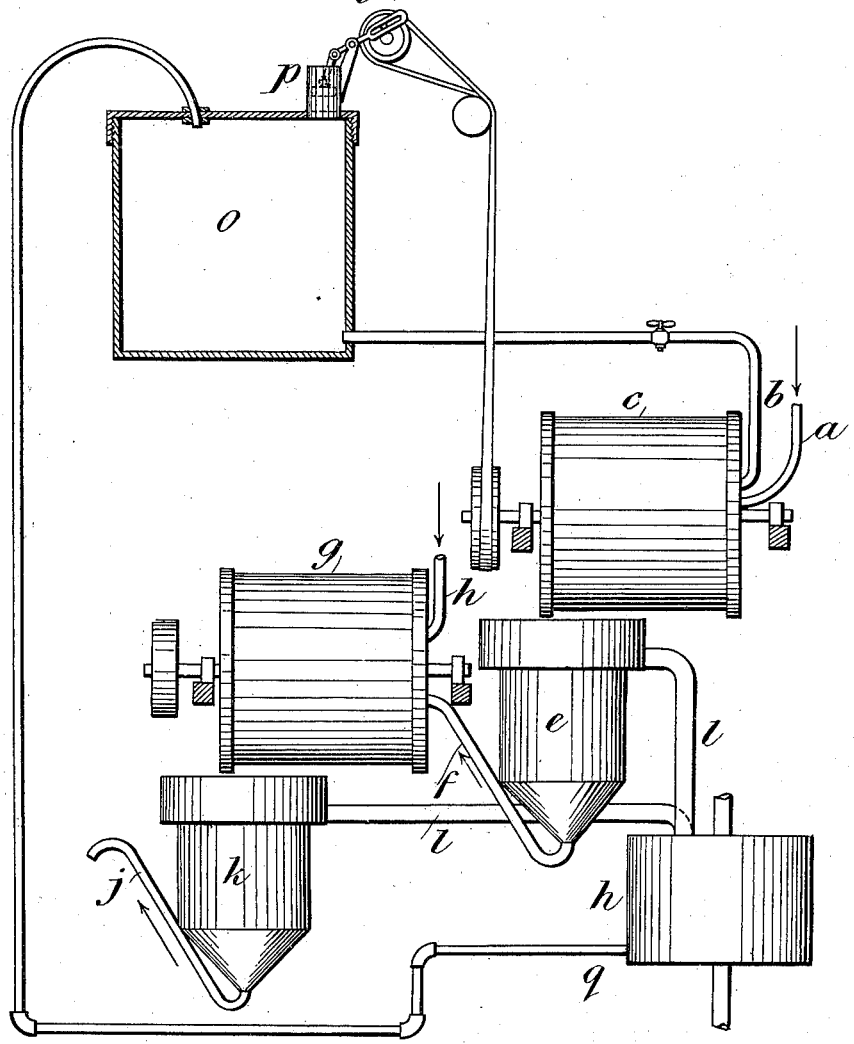

UNITED STATES PATENT OFFICE.

FRANCIS EDWARD ELMORE, OF LEEDS, ENGLAND.

APPARATUS FOR SEPARATING METALLIC FROM ROCKY CONSTITUENTS OF ORES.

SPECIFICATION forming part of Letters Patent No. 653,340, dated July 10, 1900.

Original application filed April 10, 1899, Serial No. 712,454. Divided and this application filed September 23, 1899. Serial No. 731,464. (No model.)

*To all whom it may concern:*

Be it known that I, FRANCIS EDWARD ELMORE, a citizen of England, residing at Pontefract road, Hunslet, Leeds, in the county of York, England, have invented certain new and useful Improvements in Apparatus for Separating Metallic from Rocky Constituents of Ores, (for which I have applied for a patent in Great Britain, dated October 18, 1898, No. 21,948,) of which the following is a specification.

This invention, which was originally comprised in the application for patent filed April 10, 1899, Serial No. 712,454, but has been divided out at the request of the Office, relates to apparatus for separating the metallic from the rocky constituents of ores, which I effect by bringing a mixture of the pulverized ore with water into contact with more or less thick oil, which entraps the metallic constituents and allows the rocky constituents to pass away with the water. I then separate the metallic particles from the oil, which can be used for repeated operations. The thick oil which I employ is the thick tarry residue, usually called "residuum," of mineral oil after some of the more volatile constituents have been distilled off. When the whole of the ore has been mixed with water in quantity amounting to several times the weight of the ore, this is then mixed with the thick oil. The metallic portions of the ore are retained in the oil, which does not even adhere to the earthy ingredients, the latter being held in suspension in the water.

In the accompanying drawings, Figure 1 is a vertical sectional view of an apparatus suitable for carrying my invention into effect, omitting the elevated cistern; and Fig. 2 is a side elevation of the apparatus, showing the elevated cistern.

In order to enable those skilled in the art to practice my invention, I will now describe the same in detail with reference to the drawings.

The mixture of pulverized ore and water supplied by pipe $a$ and also the oil supplied by pipe $b$ flow into one end of a drum $c$, which slowly revolves on a horizontal axis. At each end of the drum there is a circular opening, and within the drum annular helical ribs $d$ extend from end to end, the spaces between these ribs being divided into cells by a number of equidistant blades. The ore and water and the oil, which are thus mingled without being broken up, so as to form a uniform mixture, are carried from the end of the drum where they entered to the opposite end, whence they are discharged into a water-subsiding vessel $e$, in which the water and rocky constituents mostly subside, while the oil, with the metallic constituents, floats above. The lowest layer is drawn away as tailings, which may be again treated with oil by leading them by a pipe $f$ to a second drum $g$, where they are again mixed with oil supplied by a pipe $h$, the mixture being discharged into a second subsidence vessel $k$. This may be again repeated until little or none of the metallic constituents remain in the tailings. The upper layer from the subsidence vessels is led by pipes $l$ into a centrifugal drum $m$, containing a little water. As the drum rapidly revolves the metallic particles are caused by centrifugal force to pass from the oil to the water, which forms a layer next the circumference of the drum, the side of which is closed, while the oil, being lighter, flows over an inwardly-projecting lip $n$ into the casing $h'$ of the drum, whence it is removed by a pipe $q$ to be used over again. When the layer of particles and water in the centrifugal drum attains a certain thickness, the drum is stopped, the layer is removed, and the drum receives a fresh charge of water and is again worked.

The oil may be pumped up through pipe $q$ to an elevated cistern $o$ to supply the drums $c$ and $g$; but in order to clear the oil from air-bubbles I prefer to draw the oil up to the cistern by creating a partial vacuum in the cistern through the medium of any suitable means, such as a vacuum-pump $p$.

In carrying out my invention I do not employ an oil mixture. The thick oil of the kind before set forth, with the metallic ingredients entrapped in it, floats over the water, which holds in suspension the earthy ingredients which have no oil whatever adhering to them.

Instead of employing centrifugal force to separate the oil from the metallic matters mixed with it the mixture may be thinned by heating it or mingling it with solvents of the oil, such as benzoline, and left for subsidence or subjected to filter-pressing, so that the greatest portion of the oil can be recovered for subsequent use.

Having thus described the nature of this invention and the best means I know of carrying the same into practical effect, I claim—

1. The combination in an apparatus for separating metallic from rocky constituents of ore, of a rotary drum having internal helical ribs, pipes for delivering oil and ore and water into one end of said drum, a water-subsiding vessel arranged below the drum and receiving the oil, ore and water therefrom, a centrifugal drum arranged below said water-subsiding vessel, and a pipe for conducting the metallic portions and the oil from the top of the water-subsiding vessel into said centrifugal drum, substantially as described.

2. The combination in an apparatus for separating metallic from rocky constituents of ore, of a rotary drum having internal helical ribs divided into cells by longitudinal blades, pipes for delivering oil and ore and water into one end of said drum, a water-subsiding vessel arranged below the drum and receiving the oil, ore and water therefrom, a centrifugal drum arranged below the water-subsiding vessel and constructed with an inwardly-projecting lip and a surrounding casing, and a pipe for conducting the metallic portions and oil from the top portion of the water-subsiding vessel into said centrifugal drum at a point in proximity to the inwardly-projecting lip thereof, substantially as described.

In testimony whereof I have hereunto set my hand in presence of two subscribing witnesses.

FRANCIS EDWARD ELMORE.

Witnesses:
FRANCIS W. FRIGOUT,
A. NUTTING.